(12) United States Patent
Meloche et al.

(10) Patent No.: US 9,998,517 B2
(45) Date of Patent: Jun. 12, 2018

(54) SYSTEM AND METHOD FOR END-TO-END RTCP

(71) Applicant: Avaya Inc., Basking Ridge, NJ (US)

(72) Inventors: Jean Meloche, Madison, NJ (US); Heinz Teutsch, Green Brook, NJ (US); Shalini Yajnik, Berkeley Heights, NJ (US); Mehmet Balasaygun, Freehold, NJ (US)

(73) Assignee: Avaya Inc., Basking Ridge, NJ (US)

( * ) Notice: Subject to any disclaimer, the term of this patent is extended or adjusted under 35 U.S.C. 154(b) by 15 days.

(21) Appl. No.: 14/929,893

(22) Filed: Nov. 2, 2015

(65) Prior Publication Data

US 2016/0149985 A1    May 26, 2016

Related U.S. Application Data

(63) Continuation of application No. 13/485,245, filed on May 31, 2012, now Pat. No. 9,178,778.

(60) Provisional application No. 61/615,086, filed on Mar. 23, 2012.

(51) Int. Cl.
*H04L 29/06* (2006.01)
*H04L 12/24* (2006.01)
*H04L 12/26* (2006.01)

(52) U.S. Cl.
CPC ............ *H04L 65/608* (2013.01); *H04L 41/22* (2013.01); *H04L 41/5032* (2013.01); *H04L 43/06* (2013.01); *H04L 43/062* (2013.01); *H04L 43/0829* (2013.01); *H04L 43/0852* (2013.01)

(58) Field of Classification Search
None
See application file for complete search history.

(56) References Cited

U.S. PATENT DOCUMENTS 6,577,599 B1    6/2003  Gupta et al.
6,940,821 B1    9/2005  Wei et al.
(Continued)

FOREIGN PATENT DOCUMENTS

EP      2093948     8/2008
GB      2476077     12/2009
(Continued)

OTHER PUBLICATIONS

Perkins, "RTP: Audio and Video for the Internet," Jun. 21, 2003, Addison-Wesley, Boston, MA, pp. 95-111.
(Continued)

*Primary Examiner* — Vinncelas Louis
(74) *Attorney, Agent, or Firm* — Sheridan Ross P.C.

(57) ABSTRACT

Systems, methods, and non-transitory computer-readable storage media for implementing real-time transport control protocol (RTCP) to obtain end-to-end session information. The system receives an RTCP extension that is associated with an RTCP packet in a communication session. The RTCP extension may include an instruction for transmitting RTCP data based on a triggering event. The RTCP extension can be configured to propagate along the communication session. Next, in response to the triggering event, the system can transmit the RTCP data to an address defined by the instruction as a destination address for receiving information associated with the triggering event.

20 Claims, 7 Drawing Sheets

(56) References Cited

U.S. PATENT DOCUMENTS

| | | | |
|---|---|---|---|
| 7,310,334 B1* | 12/2007 | FitzGerald | H04L 29/06027 370/352 |
| 7,356,687 B2 | 4/2008 | Medvinsky et al. | |
| 7,519,006 B1 | 4/2009 | Wing | |
| 9,178,778 B2 | 11/2015 | Meloche et al. | |
| 9,356,917 B2 | 5/2016 | Balasaygun et al. | |
| 2003/0065917 A1 | 4/2003 | Medvinsky et al. | |
| 2003/0072269 A1 | 4/2003 | Teruhi et al. | |
| 2003/0142625 A1 | 7/2003 | Wan et al. | |
| 2003/0156550 A1 | 8/2003 | Burmeister et al. | |
| 2003/0221099 A1 | 11/2003 | Medvinsky et al. | |
| 2004/0057420 A1 | 3/2004 | Curcio et al. | |
| 2004/0073641 A1 | 4/2004 | Minhazuddin et al. | |
| 2004/0095939 A1 | 5/2004 | Yang | |
| 2004/0158704 A1 | 8/2004 | Oates et al. | |
| 2005/0005020 A1 | 1/2005 | Rey et al. | |
| 2005/0160152 A1 | 7/2005 | Selin et al. | |
| 2005/0243733 A1 | 11/2005 | Crawford et al. | |
| 2006/0227717 A1 | 10/2006 | van den Berg et al. | |
| 2006/0268300 A1 | 11/2006 | Suzuki | |
| 2006/0268845 A1 | 11/2006 | He et al. | |
| 2006/0285149 A1 | 12/2006 | Dei | |
| 2007/0115963 A1 | 5/2007 | Vadlakonda et al. | |
| 2007/0157026 A1 | 7/2007 | Zimmermann et al. | |
| 2007/0230361 A1 | 10/2007 | Choudhury | |
| 2007/0280127 A1* | 12/2007 | Connor | H04L 29/06027 370/252 |
| 2008/0002576 A1* | 1/2008 | Bugenhagen | H04L 41/147 370/229 |
| 2008/0031145 A1 | 2/2008 | Ethier et al. | |
| 2008/0062887 A1 | 3/2008 | Parolkar et al. | |
| 2008/0069002 A1 | 3/2008 | Savoor et al. | |
| 2008/0147658 A1 | 6/2008 | Singh et al. | |
| 2008/0162714 A1 | 7/2008 | Pettersson | |
| 2008/0205390 A1* | 8/2008 | Bangalore | H04L 65/80 370/389 |
| 2009/0028054 A1* | 1/2009 | Kumar | H04B 3/46 370/242 |
| 2009/0080336 A1 | 3/2009 | Zhang et al. | |
| 2009/0135724 A1 | 5/2009 | Zhang et al. | |
| 2009/0135735 A1 | 5/2009 | Zhang et al. | |
| 2009/0219825 A1 | 9/2009 | Denby et al. | |
| 2009/0254970 A1 | 10/2009 | Agarwal et al. | |
| 2009/0257361 A1 | 10/2009 | Deshpande et al. | |
| 2010/0150003 A1 | 6/2010 | Andreasen et al. | |
| 2010/0198979 A1 | 8/2010 | Pickens et al. | |
| 2010/0220195 A1 | 9/2010 | Li et al. | |
| 2011/0176427 A1 | 7/2011 | Huang et al. | |
| 2011/0222403 A1* | 9/2011 | Suh | H04L 41/5009 370/231 |
| 2011/0289538 A1 | 11/2011 | Begen et al. | |
| 2012/0014378 A1 | 1/2012 | Zäncker | |
| 2012/0147759 A1 | 6/2012 | Ratnakar et al. | |
| 2013/0185062 A1 | 7/2013 | Krishnan et al. | |
| 2013/0235728 A1 | 9/2013 | Le et al. | |
| 2013/0250779 A1 | 9/2013 | Meloche et al. | |
| 2013/0250786 A1 | 9/2013 | Balasaygun et al. | |
| 2014/0096198 A1 | 4/2014 | Brunson et al. | |
| 2014/0338006 A1 | 11/2014 | Grkov et al. | |

FOREIGN PATENT DOCUMENTS

| | | |
|---|---|---|
| JP | 2005073211 | 8/2003 |
| WO | WO 2009/155971 | 6/2008 |
| WO | WO 2011/112043 | 3/2010 |

OTHER PUBLICATIONS

Schulzrinne, "RTP Profile for Audio and Video Conferences with Minimal Control," RFC 1890, Jan. 1996, Network Working Group, 19 pages.

Schulzrinne et al., "RTP: A Transport Protocol for Real-Time Applications," RFC 1889, Jan. 1996, Network Working Group, 76 pages.

Official Action for European Patent Application No. 12186245.2, dated Apr. 25, 2016, 5 pages.

Office Action for U.S. Appl. No. 13/571,098, dated Aug. 31, 2015, 9 pages.

Final Office Action for U.S. Appl. No. 13/571,098, dated Dec. 31, 2015, 12 pages.

Notice of Allowance for U.S. Appl. No. 13/571,098, dated Mar. 16, 2016, 13 pages.

Office Action for U.S. Appl. No. 13/485,245, dated Jan. 2, 2014, 32 pages.

Final Office Action for U.S. Appl. No. 13/485,245, dated Jul. 7, 2014, 34 pages.

Office Action for U.S. Appl. No. 13/485,245, dated Nov. 14, 2014, 36 pages.

Final Office Action for U.S. Appl. No. 13/485,245, dated May 21, 2015, 41 pages.

Notice of Allowance for U.S. Appl. No. 13/485,245, dated Sep. 9, 2015, 19 pages.

Office Action for U.S. Appl. No. 13/606,853, dated Feb. 5, 2014, 34 pages.

Final Office Action for U.S. Appl. No. 13/606,853, dated Aug. 25, 2014, 42 pages.

Office Action for U.S. Appl. No. 13/606,853, dated Apr. 24, 2015, 26 pages.

Final Office Action for U.S. Appl. No. 13/606,853, dated Aug. 12, 2015, 31 pages.

Office Action for U.S. Appl. No. 13/606,853, dated Sep. 15, 2016, 15 pages.

Final Office Action for U.S. Appl. No. 13/606,853, dated Mar. 2, 2017, 21 pages.

Notice of Allowance for U.S. Appl. No. 13/606,853, dated Aug. 18, 2017, 11 pages.

* cited by examiner

SYSTEM AND METHOD FOR END-TO-END RTCP

PRIORITY CLAIM

The present application is a continuation of U.S. patent application Ser. No. 13/485,245, filed May 31, 2012, which claims the benefit of U.S. Provisional Application No. 61/615,086, filed Mar. 23, 2012, which is incorporated herein by reference in its entirety.

The present application is related to U.S. Non-provisional application Ser. No. 13/571,098, filed Aug. 9, 2012; and U.S. Non-provisional application Ser. No. 13/606,853, filed Sep. 7, 2012; which are incorporated herein by reference in their entirety.

BACKGROUND

1. Technical Field

The present disclosure relates to real-time transport control protocol and more specifically to implementing real-time transport control protocol to obtain end-to-end session information.

2. Introduction

Troubleshooting media performance issues in a communication session can be an extremely difficult task. When users experience poor audio or video quality during a call, they are typically unable to identify the source of the problem, particularly as the size and complexity of the call increases. Without knowing the source of the problem, users are often left with few—mostly imprecise—troubleshooting measures, such as ending the call to establish a new call, or incrementally muting the phones to isolate the troublemaker. But many times, the problem persists as users exhaust their troubleshooting options. Overall, the process can be long and the experience frustrating and the outcome costly.

Engineers similarly have great difficulty identifying the source of the problem in a call. The resolution of call-quality problems is a formidable challenge precisely because the availability of relevant information is scarce: gathering the necessary information to perform a thorough analysis can be an expensive and onerous proposition. For example, often times, an engineer will receive a complaint from a user reporting poor audio or video quality during a past call. The engineer begins the troubleshooting process by trying to understand the problem. What is the model of the phone being used? Is it a handset or a speaker phone? Is the problem a recurring one? Is the phone shuffling or is a gateway involved? What is the codec being used? Is the gateway transcoding? Is there a bridge involved? Is there packet loss? What is the network topology? Answers to these and many other questions are essential to understanding and troubleshooting the problem. Yet, currently, there are no existing tools that push this information out to the phones or session endpoints. Instead, engineers typically must deploy sniffers on the network to record the actual media received at a particular endpoint, an expensive and laborious process.

Real-time transport control protocol (RTCP) packets can be analyzed to obtain some relevant information. RTCP provides feedback on the quality of data distribution in a real-time transport protocol (RTP) flow. In particular, RTCP packets provide a summary of the quality over a single hop of the media path at the application layer. However, except in the limited case of a pair of shuffling IP phones, the end-to-end media traverses through multiple hops. Consequently, RTCP packets generally do not provide an end-to-end summary of the quality of a session. Thus, engineers do not have effective tools or techniques for measuring the end-to-end quality of a media session. And while session quality for a media session is experienced on an end-to-end basis, engineers are unable to determine which element in the network path is creating the problem when the problem arises.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein provide a fast, efficient, and scalable technique for obtaining end-to-end information about a communication session. These approaches allow users and engineers to obtain link-by-link quality of service (QoS) in a fast and cost-effective manner. The end-to-end information can provide an overall view of the communication session, as well as a summary of each hop involved in the communication session. This information can greatly facilitate the network monitoring and troubleshooting process. For example, end-to-end session information can be used to determine the network topology in a communication session. Moreover, end-to-end quality information can be used to quickly identify the precise point of failure or weakness in the network path.

Disclosed are systems, methods, and non-transitory computer-readable storage media for implementing real-time transport control protocol to obtain end-to-end performance information. A device receives a real-time transport control protocol extension associated with a real-time transport control protocol packet in a communication session, wherein the real-time transport control protocol extension includes an instruction for transmitting real-time transport control protocol data based on a triggering event, and wherein the real-time transport control protocol extension is configured to propagate along the communication session. The triggering event can include a request, a network change, a communication problem, a media problem, a parameter, a status, a threshold, a schedule, an error, etc.

In response to the triggering event, the device transmits the real-time transport control protocol data to an address defined by the instruction as a destination address for receiving information associated with the triggering event. The real-time transport control protocol data can include, for example, a differentiated services trace, a global session identifier, a transcoding and gain table, a signal strength, a topology, an access mode, a real-time transport control protocol packet, a quality of service, encryption information, hardware information, security information, hop-by-hop information about the communication session, and information related to network characteristics, and so forth. In this context, transcoding can refer to switching from one speech codec to another (e.g., G.711 to G.729) within the call path. Moreover, a gain table can refer to a loss and level plan according to specific telecommunication requirements, such as Telecommunications Industry Association (TIA) 912-A requirements. Here, the gain table can be a matrix of gain values that determine what gain/loss a media gateway applies when calls are routed from one trunking domain to another (e.g., analog to/from IP).

The real-time transport control protocol data can be used, among other things, to troubleshoot a network problem, calculate an end-to-end quality of service, determine a network topology, monitor a communication session, calculate a performance status, identify an encryption status, etc. In one embodiment, the device receives a user request for an end-to-end real-time transport control protocol report, and presents the end-to-end real-time transport control protocol report to the user. Here, the end-to-end real-time transport control protocol report can based on the real-time transport control protocol data. The end-to-end real-time transport control protocol report can be used to generate a visual representation of the communication session or an alert related to the communication session. The end-to-end real-time transport control protocol report can also be used to troubleshoot a network problem, determine security information, calculate an end-to-end quality of service, determine a network topology, monitor a communication session, calculate an encryption status, calculate a media path performance, and so forth.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for efficiently calculating end-to-end session information. A system, method and non-transitory computer-readable media are disclosed for implementing real-time transport control protocol to obtain end-to-end session information. A brief introductory description of a basic general purpose system or computing device in FIG. 1, which can be employed to practice the concepts, is disclosed herein. A more detailed description of end-to-end real-time transport control protocol will then follow. These variations shall be discussed herein as the various embodiments are set forth. The disclosure now turns to FIG. 1.

Figure 1:
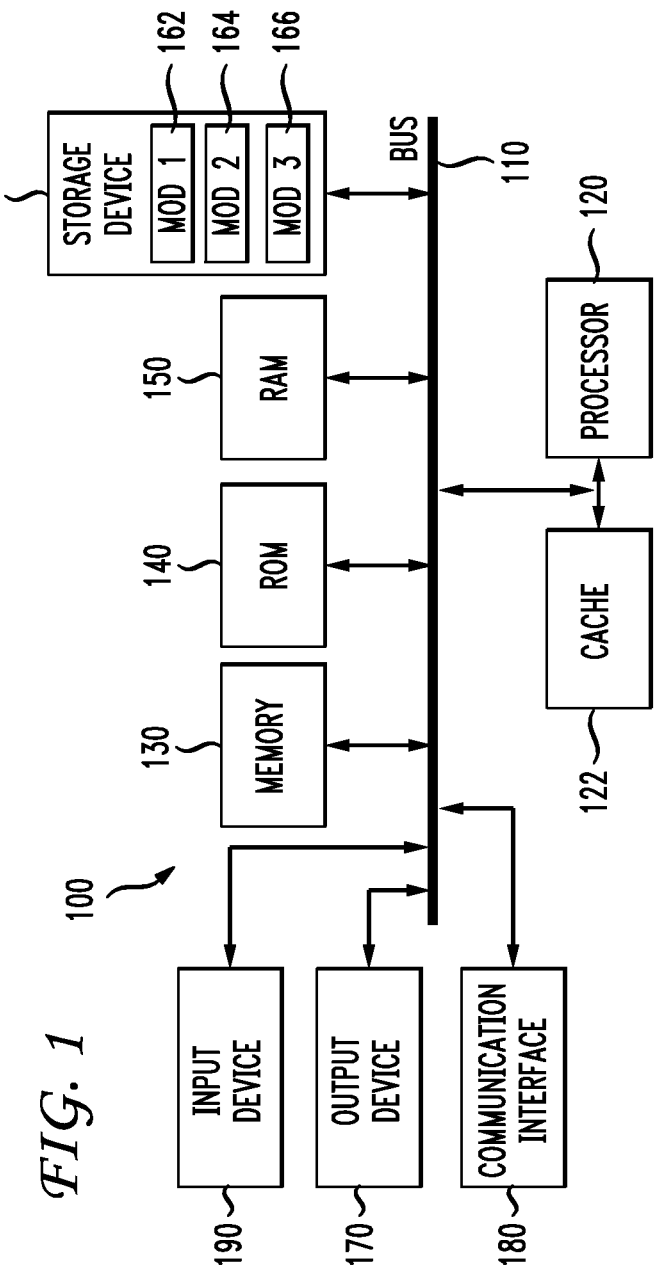
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
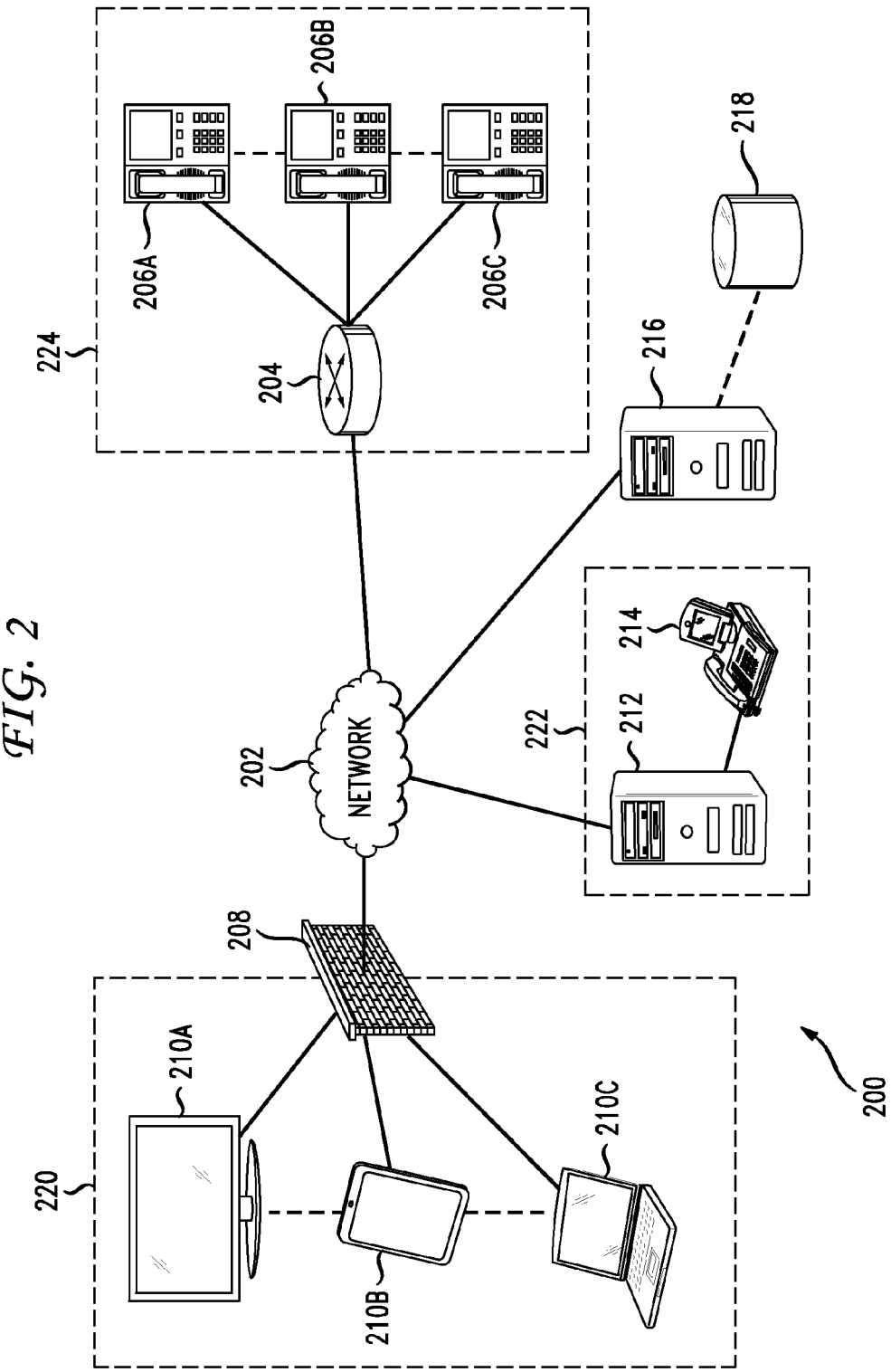
FIG. 2 illustrates an exemplary end-to-end real-time transport control protocol architecture.

Having disclosed some components of a computing system, the disclosure now turns to FIG. 2, which illustrates an exemplary end-to-end real-time transport control protocol architecture 200. Real-time transport control protocol (RTCP) is an extensible protocol that lends itself to both standard and proprietary extensions. To this end, an RTCP extension is implemented in the end-to-end RTCP architecture 200 to provide an indication to media engines involved throughout a call topology that RTCP information needs to be forwarded to one or more destinations.

In FIG. 2, the router 204, the firewall 208, and the servers 212, 216 communicate via a network 202. The network 202 can include a public network, such as the Internet, but can also include a private or quasi-private network, such as an intranet, a home network, a virtual private network (VPN), a shared collaboration network between separate entities, etc. Indeed, the principles set forth herein can be applied to many types of networks, such as local area networks (LANs), virtual LANs (VLANs), corporate networks, wide area networks, and virtually any other form of network.

The voice over IP (VoIP) terminals 206A, 206B, 206C communicate with the network 202 via a router 204; the media devices 210A, 210B, 210C communicate with the network 202 via a firewall 208; and the IP video phone 214 communicates with the network 202 via a Session Initiation Protocol (SIP) server 212. The VoIP terminals 206A, 206B, 206C and the media devices 210A, 210B, 210C can include virtually any device with networking capabilities, such as a computer, a phone, a video game console, a conferencing system, a network media player, etc. As shown in FIG. 2, the network device 210A is an IP television, the network device 210B is a smart phone, and the network device 210C is a laptop computer.

The terminals 206A, 206B, 206C, 210A, 210B, 210C, 214 and the network components 204, 208, 212, 216 can communicate real-time transport control protocol (RTCP) packets with other terminals and network components. The RTCP packets can include RTCP extensions, RTCP data, RTCP reports, etc. The RTCP extensions, RTCP data, or RTCP reports can include instructions for transmitting RTCP information, such as RTCP data, based on a triggering event. A triggering event can include a request, a network change, a configuration, a software/hardware change, a task, a command, a communication problem, a media problem, a parameter, a flag, a signal, a threshold, a status, a schedule, a message, an acknowledgment, an instruction, an indication, an error, and so forth.

The RTCP information can include, for example, a differentiated services trace, a global session identifier, a transcoding and gain table, a signal strength, a topology, an access mode, an RTCP packet, security information, an encryption status, a configuration, routing information, flow statistics, delay information, a noise calculation, a bit rate, a media quality, network congestion data, instructions, quality of service, status information, hardware information, hop-by-hop information, information related to network characteristics, etc. The instructions for transmitting RTCP information can be configured to propagate along the communication session. For example, the terminals 206A, 206B, 206C, 210A, 210B, 210C, 214 and network components 204, 208, 212, 216 can be configured to propagate the instructions to other terminals and network components in the communication session. This way, the devices involved in the communication session are able to automatically transmit the RTCP information throughout the communication session.

The combined RTCP information can be analyzed and used to generate an end-to-end representation of the communication session. For example, the RTCP information transmitted by the terminals 206A, 206B, 206C, 210A, 210B, 210C, 214 can be collected to yield end-to-end RTCP data. The end-to-end RTCP data can then be analyzed to generate an end-to-end RTCP report, which can be, for example, presented to a user, stored at a logging device, and/or provided to a monitoring agent.

Further, end-to-end RTCP data associated with one or more real-time transport protocol (RTP) streams can be integrated to provide a complete end-to-end picture of the network topology and media performance. Normally, RTCP data is exchanged between adjacent nodes of the network topology with the purpose of providing feedback to adjacent nodes about the network performance that pertains to the RTP stream exchanged between the adjacent nodes. However, when media associated with a communication session traverses other network components, such as a conference bridge or a gateway, the end-to-end media path is divided by segments residing between the adjacent nodes. In this case, the RTCP data exchanged between adjacent nodes represents the performance over a segment of the media path. Thus, the RTCP data for the various segments of the media paths can be integrated to obtain the end-to-end performance of the media path.

For example, RTCP data representing a performance for each of segments 220, 222, and 224 can be integrated to obtain the end-to-end performance of the media path for a communication involving all three segments 220, 222, and 224. To this end, the RTCP data can be collected, for example, at one of the terminals 206A, 206B, 206C, 210A, 210B, 210C, 214, the server 216, or any other device with storage capabilities, and combined to obtain an end-to-end performance calculation. In FIG. 2, the terminals 206A, 206B, 206C, 210A, 210B, 210C, 214 are configured to transmit RTCP data to the server 216, which serves as an RTCP collector. The server 216 stores the RTCP data in a storage 218, which can be local or remote, and analyzes the RTCP data to generate an end-to-end report of the communication session. The server 216 can also forward the RTCP data to another device, such as a monitoring device.

In one embodiment, the terminals 206A, 206B, 206C, 210A, 210B, 210C, 214 use the RTCP channel to communicate RTCP data, such as RTCP reports and extensions, throughout the media topology. RTCP is present throughout the media topology in any multimedia signaling scheme, such as SIP and H.323 signaling. Indeed, RTCP provides a signaling agnostic channel that can be leveraged for RTCP data propagation and dynamic provisioning as set forth herein. Thus, by using the RTCP channel, the terminals 206A, 206B, 206C, 210A, 210B, 210C, 214 can transmit RTCP data end-to-end, circumventing problems that may arise when a device is behind a firewall or a network address translation (NAT) device. For example, the RTCP data can be transmitted to and from any device behind the firewall 208 (media devices 210A, 210B, 210C) via the RTCP channel, provided that appropriate firewall pin holes are opened to allow exchange of RTCP packets bi-directionally.

Moreover, the RTCP information can be used to provide an overall call quality indication for an end user participating on an audio, video, and/or multimedia call. Here, the RTCP information can be used to calculate a media leg quality for the media legs in a media path. The media leg quality for the media legs in a media path can then be used to determine a media path quality, which, in some aspects, can be represented as a media path score. The media legs in a call can be determined based on the layer 7 media topology of the call. For example, in some aspects, if a gateway or any other element in the call is simply passing the media through (e.g., hairpinning) without decrypting the media, then that gateway or element is not considered part of the media topology and, therefore, is not defined as a media leg. A media leg quality can be based on various factors, such as jitter, playout delay, round trip delay, packet loss, packet loss burst, codec used for the call, signal strength, errors, etc. For example, a media leg quality can be a function of the codec used, the jitter, the delay experienced, and/or the packet loss experienced.

Other exemplary devices which could be connected in the illustrated RTCP architecture 200 include, for example, tablet computers, hand held media players having networking capabilities, personal digital assistants, and vehicles equipped with mobile network access. Each device in the RTCP architecture 200 can be equipped with a capability to produce media communications, including audio, video, text, or any other communication format. Moreover, each device can include media engines which format and manipulate raw data into packets. In some media engines, the raw data can require modulation and manipulation to correctly format the raw data into packets; in other media engines, the raw data simply needs to be formatted and inserted into packet configurations. As those of skill in the art will readily understand, the RTCP architecture 200 can also include many other types of network components, such as bridges, switches, hubs, gateways, databases, endpoints, signaling systems, computer clusters, mixing elements, border elements, multipoint control units, and so forth.

Figure 3:
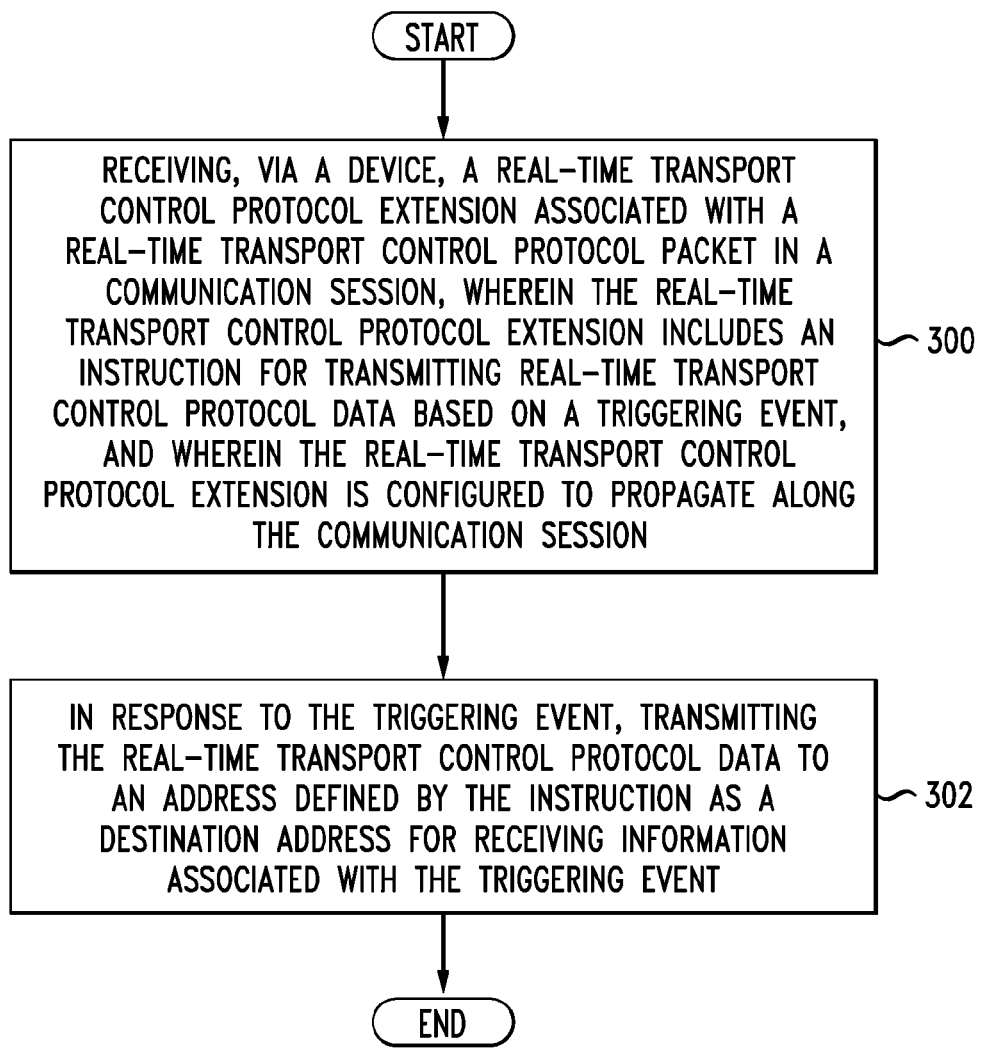
FIG. 3 illustrates a first exemplary method embodiment.
Figure 4:
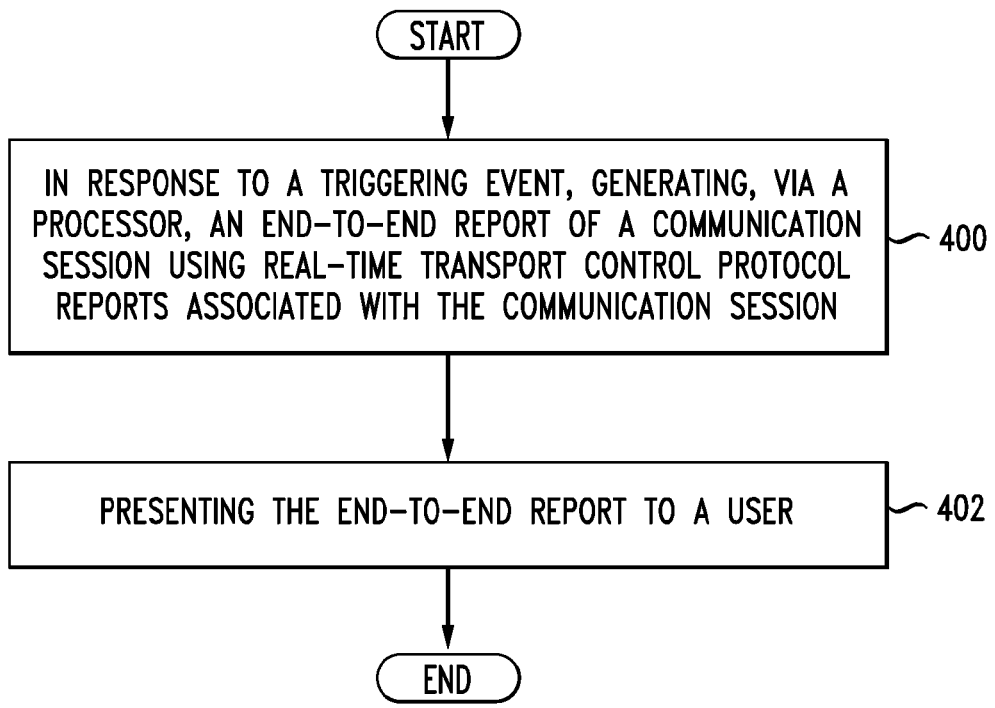
FIG. 4 illustrates a second exemplary method embodiment.
Figure 5:
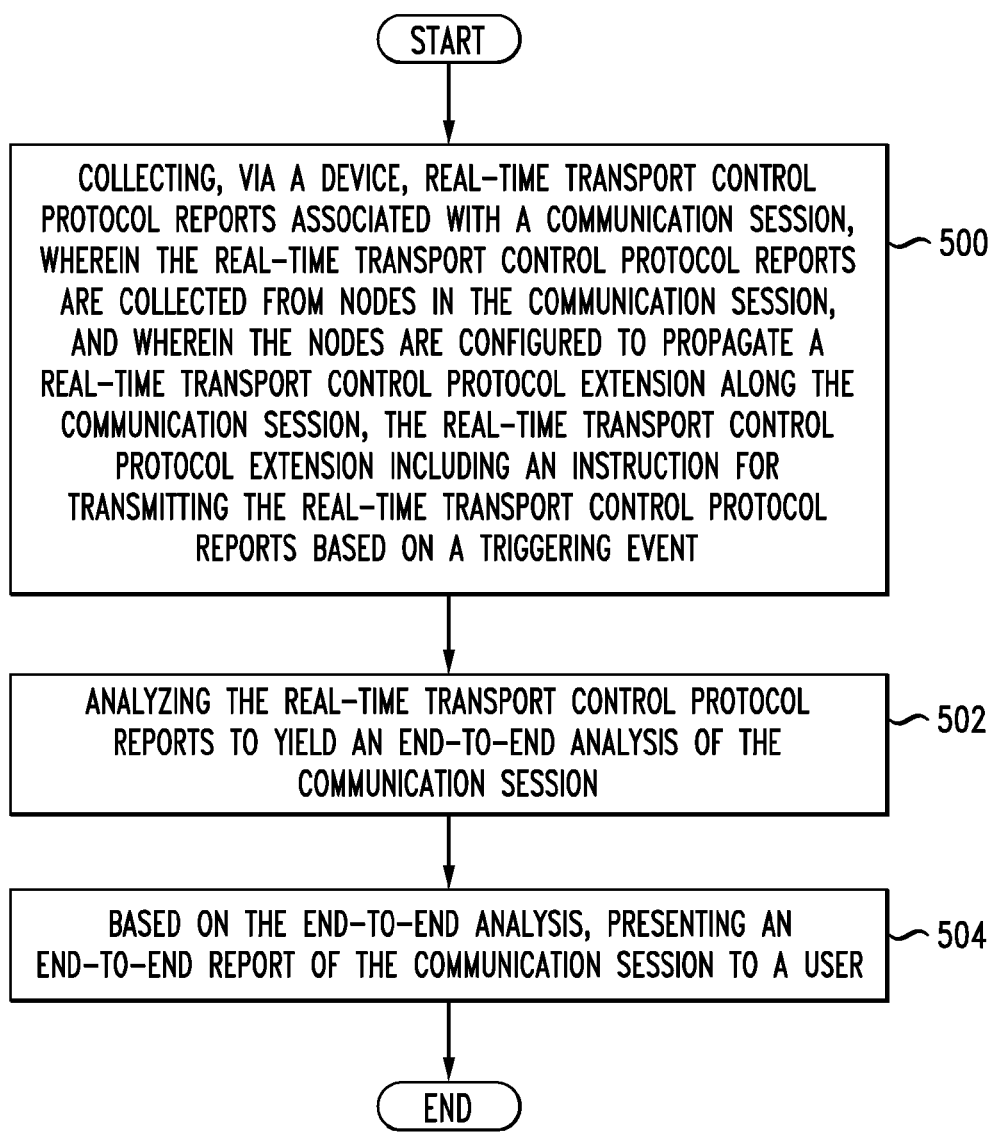
FIG. 5 illustrates a third exemplary method embodiment.

Having disclosed some basic system components and concepts, the disclosure now turns to the exemplary method embodiments shown in FIGS. 3-5. For the sake of clarity, the methods are discussed in terms of an exemplary system 100, as shown in FIG. 1, configured to practice the methods. The steps outlined herein are exemplary and can be implemented in any combination thereof, including combinations that exclude, add, or modify certain steps.

FIG. 3 illustrates a first exemplary method embodiment. Here, the system 100 first receives an RTCP extension associated with an RTCP packet in a communication session, wherein the RTCP extension includes an instruction for transmitting RTCP data based on a triggering event, and wherein the RTCP extension is configured to propagate along the communication session (300). The RTCP data can include, for example, a differentiated services trace, a global session identifier, a transcoding and gain table, a signal strength, a topology, a status, a log, a configuration, an access mode, an error, an RTCP report, an acknowledgement, feedback information, encryption information, session information, routing information, hardware information, hop-by-hop information, quality of service, flow statistics, information related to network characteristics, and so forth. Moreover, the triggering event can include, for example, a request, a command, a status, a configuration change, a hardware change, a network change, a condition, a message, a communication status, a media status, a signal, a parameter, a threshold, a schedule, an update, an error, an acknowledgment, an instruction, and so forth.

The RTCP extension can be, for example, a packet, a field, a signal, a header, a frame, a flag, a message, a report, a rule, an instruction, an indication, data, etc. Moreover, the RTCP extension can include multiple rules for transmitting RTCP data according to different triggering events. For example, the RTCP extension can include a rule for transmitting all of the RTCP data in response to a user request for the RTCP data, and another rule for transmitting a specific portion of the RTCP data every 30 minutes. As another example, the RTCP extension can include a rule for transmitting some or all of the RTCP data when the system 100 detects a delay and/or receives an Internet Control Message Protocol (ICMP) message, and another rule for transmitting a portion of the RTCP data in response to a user request that portion of the RTCP data.

The RTCP extension can also include rules specifying the destination address used in transmitting the RTCP data. In one embodiment, the RTCP extension includes a list of destination addresses and instructions for selecting a destination address based on a rule and/or triggering event. For example, the RTCP extension can specify an IP address as a destination address for periodically transmitting RTCP data, and a different IP address as the destination address for transmitting RTCP data when a threshold is exceeded. In another embodiment, the RTCP extension specifies an IP address and port number as the destination address for transmitting RTCP data to nodes residing in the same network segment, and a different IP address and/or port number as the destination address for transmitting RTCP data to nodes residing in other network segments. The RTCP extension can also include alternative addresses for redundancy flexibility.

Next, in response to the triggering event, the system 100 transmits the RTCP data to an address defined by the instruction as a destination address for receiving information associated with the triggering event (302). The RTCP data can be used, among other things, to troubleshoot a network problem, calculate an end-to-end quality of the communication session, determine a network topology, monitor the communication session, generate a summary and/or representation of the communication session, create an RTCP report, etc. The address can be associated with a node, a server, a phone, a computer, a cloud, an endpoint, a media device, a monitoring agent, and so forth. Alternatively, the address can be associated with the system 100, in which case the system 100 itself can act as an RTCP collector.

In one embodiment, the system 100 receives a user request for an end-to-end RTCP report and presents the end-to-end RTCP report to the user. Here, the system 100 can generate the end-to-end RTCP report based on the user request and the RTCP data. For example, when a user presses a button on a user interface, the system 100 can generate the end-to-end RTCP report and present it on a display. The display can be part of the system 100 and/or a separate display device. The display can also be a touch screen, which allows a user to interact with the end-to-end RTCP report through the touch screen. For example, the touch screen can present a graphical view of the communication session that is based on the end-to-end RTCP report, and a user can then select, through the touch screen, a device or media path in the communication session to view additional details about the selected device or media path. The touch screen can also include controls to allow the user to actively control the experience. For example, the user can control the type and amount of information that is generated or analyzed, the type and amount of information that is displayed, the method and format for displaying such information, etc. Through the touch screen, the user can also perform many other functions, such as transmitting an alert or indication to other devices in the communication session, displaying session information at another location, forwarding information to another device, etc.

The end-to-end RTCP report can be based on the RTCP data and any other relevant information. For example, the end-to-end RTCP report can be based on the RTCP data and a log file. The end-to-end RTCP report can also be based on events, statistics, errors, parameters, and external information, for example. Further, the end-to-end RTCP report can include a topology, a delay, a packet loss, a differentiated services trace, status information, routing information, configuration information, hardware information, end-to-end media performance, jitter, end-to-end quality of service, end-to-end security information, communication errors, events, traffic data, network statistics, and so forth. The end-to-end RTCP report can be used, for example, to provide a visual representation of the communication session or an alert related to the communication session. The end-to-end RTCP report can also be used to troubleshoot a network problem, calculate an end-to-end quality of service, determine a network topology, measure an end-to-end security level, monitor a communication session, determine a media path in a call, and so forth.

FIG. 4 illustrates a second exemplary method embodiment. In response to a triggering event, the system 100 first generates an end-to-end report of a communication session using RTCP reports associated with the communication session (400). The system 100 can receive and/or collect the RTCP reports from devices involved in the communication session. The system 100 can be part of the communication session or can be a separate device configured to receive and/or collect RTCP reports. The system 100 can also serve as a centralized location for collecting RTCP reports. Here, the system 100 can be configured to receive RTCP reports via the RTCP channel to circumvent any firewalls or NAT devices. To this end, appropriate firewall pin holes can be opened to allow the exchange of RTCP packets bi-directionally. In one embodiment, the system 100 integrates RTCP reports representing different network segments to generate the end-to-end report. The end-to-end report can include a network topology, a delay, a packet loss, status information, routing information, configuration information, hardware information, end-to-end quality of service, jitter, end-to-end security, end-to-end statistics, end-to-end events, network characteristics, traffic statistics, hop-by-hop details, and so forth.

Next, the system 100 presents the end-to-end report to a user (402). The system 100 can present the end-to-end report to the user based on the triggering event. In one embodiment, the system 100 automatically presents the end-to-end report after the system 100 generates the end-to-end report. In another embodiment, the system 100 periodically presents the end-to-end report after a specified duration. The system 100 can also forward the end-to-end report to another device for analysis, storage, monitoring, and/or presentation. For example, the system 100 can forward the end-to-end report to an address specified by an instruction or setting on the system 100.

FIG. 5 illustrates a third method embodiment. The system 100 collects RTCP reports associated with a communication session, wherein the RTCP reports are collected from nodes in the communication session, and wherein the nodes are configured to propagate an RTCP extension along the communication session, the RTCP extension including instructions for transmitting the RTCP reports based on a triggering event (500). The nodes can reside on the same network segment as the system 100, or any other segment. The system 100 can be part of the communication session, or can be a separate device configured to collect the RTCP reports. Moreover, the system 100 can be any device with networking capabilities, such as a server, a phone, a media device, a computer, a database, a network component, a monitoring agent, an endpoint, etc. Also, the system 100 can be configured to serve as a centralized location for collecting the RTCP reports. In one embodiment, the system 100 is a Service Level Agreement (SLA) monitor configured to collect the RTCP reports. In this case, the system 100 can also be triggered to capture packets sent and received by every node that incorporates the SLA monitor agent. Such capture of packets can provide a thorough description of the media topology, which can serve as a powerful troubleshooting and diagnostic tool.

The system 100 then analyzes the RTCP reports to yield an end-to-end analysis of the communication session (502). Based on the end-to end analysis, the system 100 can present an end-to-end report of the communication session to a user. The system 100 can integrate the RTCP reports to generate the end-to-end report. Moreover, the system 100 can present the end-to-end report in a display on the system 100 or a separate display on another device. The end-to-end report can include a network topology, a delay, a packet loss, session statistics, routing information, configuration information, hardware information, end-to-end quality of service, jitter, end-to-end security information, end-to-end events, end-to-end errors, network characteristics, traffic statistics, hop-by-hop statistics, media (audio and/or video) quality metrics, etc.

A communication path between two or more devices can include an inward media path and an outward media path. Accordingly, the system 100 can determine an inward media path quality and an outward media path quality to determine the quality of incoming and outgoing communications in the communications session. The system 100 can determine the inward media path quality based on the media leg qualities calculated for the media legs in the inward media path, and the outward media path quality based on the media leg qualities calculated for the media legs in the outward media path. The system 100 can also combine the inward media path quality and the outward media path quality to determine the overall quality of the media path, including both the inward and outward media paths.

Furthermore, a communication session involving multiple participants can include multiple media paths based on the multiple participants. Here, the system 100 can determine a media path quality for each of the multiple media paths, and combine the media path qualities to calculate an overall media path quality for the call. In some aspects, each of the multiple media path qualities can include an inward and outward media path quality for a media path. For example, each of the multiple media path qualities can correspond to an overall media path quality for a media path including both an inward media path and an outward media path. Thus, the overall media path quality can represent the overall quality of the call, including incoming and outgoing communications. The system 100 can then generate an overall call quality indication based on the overall media path quality. For example, A can participate on a conference call on a conferencing server along with B, C, D, and E. A's colleague, F, decides to bridge onto the conference call. This creates a mini-conference call in the media gateway, where the media gateway conference call is linked into the conferencing server conference. B may also be behind a media gateway that transcodes media exchanges with B.

The media topology in this example can be represented as follows:

A⇆GW⇆CS (link between A and the conferencing server CS);

B⇆GW⇆CS (link between B and the conferencing server CS);

C⇆CS (link between C and the conferencing server CS);

D⇆CS (link between D and the conferencing server CS);

E⇆CS (link between E and the conferencing server CS); and

F⇆GW⇆CS (link between F and the conferencing server CS).

In the media topology illustrated above, with respect to communications between A and B, there are 8 media legs (A→Media Gateway, Media Gateway→A, Media Gateway→Conferencing Server, Conferencing Server→Media Gateway, B→Media Gateway, Media Gateway→B, Media Gateway→Conferencing Server, Conferencing Server→Media Gateway), and 2 media paths (A→B, B→A). When determining the call quality for communications between A and B, a different score can be computed for each media path. For example, a score can be computed for media path A→B, and another score can be computed for media path B→A. Each score is a media path quality (MPQ), which can be combined to yield an overall MPQ between A and B. Similarly, when determining the overall call quality for all communications, a different score can be computed for each media path in the conference call. For example, a score can be computed for media path A→B, another score can be computed for media path B→A, and respective scores can be computed for the remaining media paths between all of the participants. Each score can then be combined to yield an overall MPQ for the conference call.

The outward media path quality can be used to determine if a participant in the call can be heard by the other participants. For example, to determine if A can be heard by other participants, the outward media path for A can be determined as follows: for each outward media path (e.g., A→B, A→C, A→D, A→E, and A→F), MPQ=min(MLQ$_i$, i=N), where MLQi is the media leg quality i and N is the number of media legs in the outward media path. Here, the quality of the path is determined by its weakest link. The average of the MPQs for all outward media paths can then be used to create an overall summary indication of how well A is heard by the other participants (B, C, D, E, and F).

Moreover, the inward media path quality can be used to determine if a participant in the call can hear the other participants. For example, to determine if A can hear B, C, D, E, and F, the inward media path for A can be determined as follows: for each inward media path (e.g., B→A, C→A, D→A, E→A, and F→A), MPQ=min(MLQ$_i$, i=N), where MLQi is the media leg quality i and N is the number of media legs in the inward media path. The average of the MPQs for all inward media paths can then be used to create an overall summary indication of the quality of the incoming media (i.e., how well A is able to hear B, C, D, E, and F).

Each participant in the call has a different view of the call quality, which is based on the outward and inward quality calculations made at each participant's endpoint. Based on the outward and/or inward media path quality for each participant, the system 100 can display an indication, summary, report, view, and/or any other representation of the outward and/or inward call quality. The system 100 can also display an indication, summary, report, view, and/or any other representation of the overall call quality, which is based on all the media path qualities. In one embodiment, the outward media path quality is displayed as a media quality indication, and the inward media path quality is used to troubleshoot a media problem experienced by a participant.

For each participant, the system 100 can provide an indication of the overall quality of the call. The indication of the overall quality of the call can be displayed on the system 100, or a remote device, as a graphical representation of the overall quality of the call, for example. The system 100 can also provide a conference roster list which includes individual quality indicators for the participants in the conference call.

Figure 6:
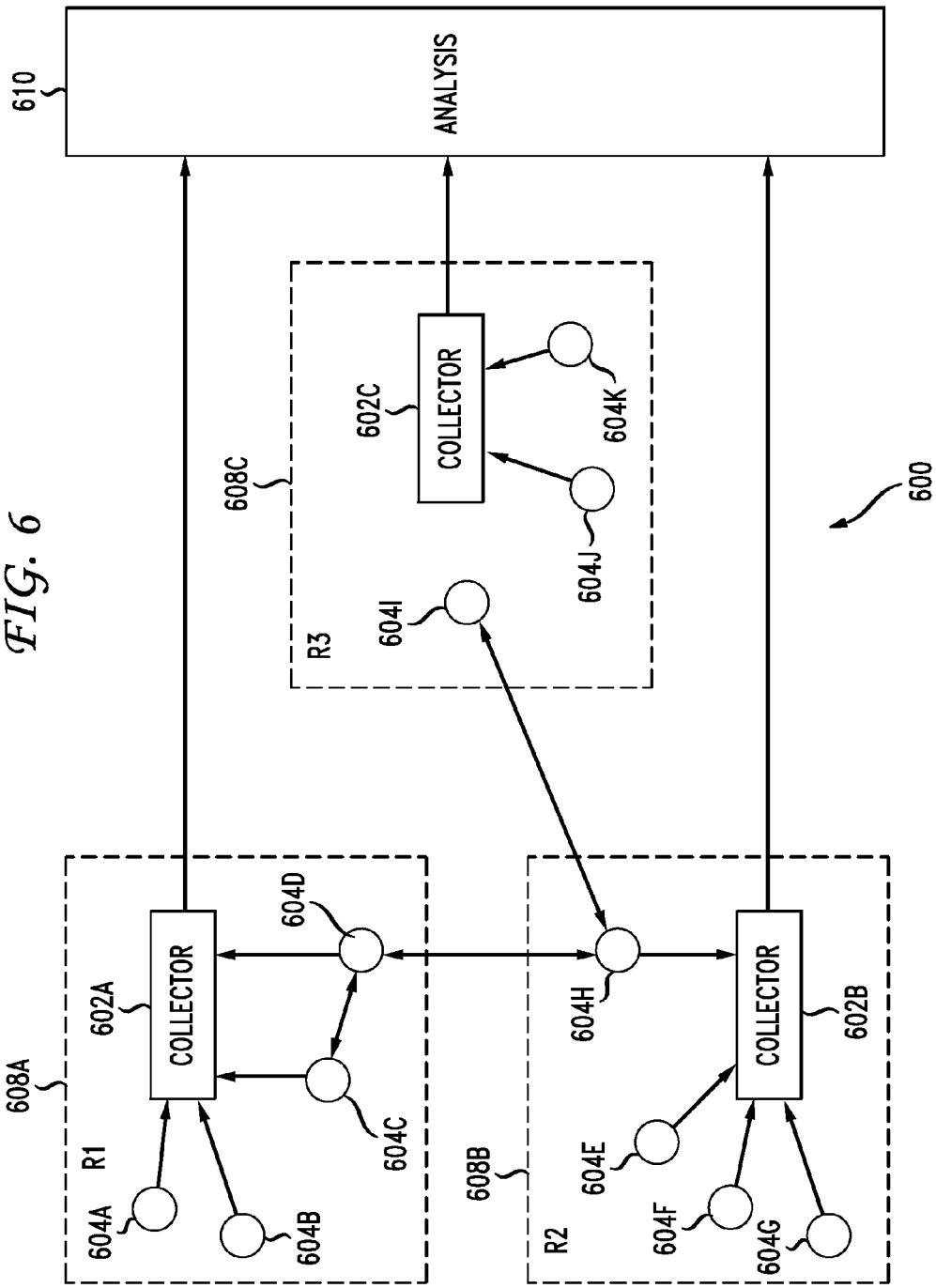
FIG. 6 illustrates an exemplary dual unicast real-time transport control protocol monitoring architecture.

FIG. 6 illustrates an exemplary dual unicast real-time transport control protocol monitoring architecture 600. The nodes 604A-K are assigned to network regions 608A-C, and the network regions 608A-C are assigned to RTCP collectors 602A-C. The nodes 604A-K are configured to send a copy of their RTCP data to the RTCP collectors 602A-C according to their assigned network regions 608A-C. The collectors 602A-C are configured to collect the RTCP data from the nodes 604A-K and transmit the RTCP data to a centralized location 610 for analysis. The collectors 602A-C can also be configured to implement a query mechanism by which endpoints and network elements involved in an end-to-end media exchange can query the collectors 602A-C to find out about the overall media status associated with the end-to-end media session.

A node can include, for example, a voice engine, a codec, a processor, a compressor, a display, a network interface, a filter, a converter, a controller, an antenna, a bridge, a computer, a phone, a router, a playback device, an input device, a database, a software agent, a gateway, and so forth. The network regions 608A-C can include, for example, one or more networks and/or one or more network segments. The RTCP collectors 602A-C can be any device configured to receive RTCP data, such as a phone, a computer, a server, a storage device, a monitoring device, etc. Moreover, the centralized location 610 can include any device configured to analyze RTCP data. For example, an RTCP collector can be a phone, a server, a node, a computer, a database, a service level agreement (SLA) monitor, a storage device, a software agent, a cluster, a cloud, etc. The centralized location 610 can be in one of the network regions 608A-C, or a separate network and/or network region.

In FIG. 6, nodes 604A-D are assigned to region 608A, which is assigned to collector 602A. Here, nodes 604A-D are configured to send a copy of their RTCP data to collector 602A, and the collector 602A is configured to send the RTCP data from the nodes 604A-D to the centralized location 610. Nodes 604E-H are assigned to region 608B, which is assigned to collector 602B. Thus, nodes 604E-H are configured to send a copy of their RTCP data to collector 602B, which is configured to send the RTCP data from the nodes 604E-H to the centralized location 610. The nodes 604I-K are assigned to region 608C, which is assigned to collector 602C. Accordingly, nodes 604I-K are configured to send a copy of their RTCP data to collector 602C, and the collector 602C is configured to send the RTCP data from the nodes 604I-K to the centralized location 610.

The centralized location 610 receives the RTCP data from the collectors 602A-C and analyses the RTCP data to generate an end-to-end RTCP analysis. The centralized location 610 can analyze the RTCP data in response to a triggering event, such as, for example, a user request, or it can do so periodically according to, for example, a schedule and/or a parameter. The end-to-end RTCP analysis can be used to monitor a communication session, troubleshoot a network problem, calculate an end-to-end quality of service, determine end-to-end security information, collect statistics, manage a communication session, calculate a media path, identify a problem, obtain end-to-end feedback, determine and/or adjust configuration settings, calculate an encryption status/level, determine a network topology, and so forth. The end-to-end RTCP analysis can also be used to generate an end-to-end summary, a session chart, an end-to-end report, and/or any representation of a communication session.

In one embodiment, the collectors 602A-C are configured to implement a query mechanism that allows network elements involved in a call to query the collectors 602A-C for the overall status of the call. The query mechanism can be implemented using an explicit request/response message, or by making uni-directional RTCP streams to collectors bi-directional. Network elements can query the collectors 602A-C according to their network regions, for example. To illustrate, nodes 604A-D can be configured to query collector 602A to obtain information regarding the overall status of the call, as nodes 604A-D and collector 602A reside on the same region (region 608A). This way, the collectors 602A-C can provide overall media status information they obtain from the centralized location 610 to all involved elements in their region. Network elements can also be configured to query collectors in other regions. For example, network elements can be configured to query other collectors based on a schedule, a policy, a configuration, a load, a load balancing need, a flag, a topology, etc. Similarly, the centralized location 610 can be configured to push overall media information to the collectors 602A-C by converting uni-directional RTCP streams from the collectors 602A-C to the centralized location 610 to bi-directional streams. The centralized location 610 can also be configured to push overall media information to the collectors 602A-C by implementing a query mechanism by which the collectors 602A-C can obtain information regarding the overall media status of a call. In some variations, the network elements inside a region do not directly talk to the centralized location 610, but let the centralized location 610 disperse overall quality information to the collectors 602A-C, effectively creating a mechanism by which the centralized location 610 does not get overloaded with traffic from all network elements involved in the media session.

In one embodiment, the end-to-end RTCP analysis is used to generate an alert, a message, and/or an image that identifies a communication problem. For example, the end-to-end RTCP analysis can be used by a phone to display a list/map of devices participating in the communication session, with a visual indication of the status of each device and/or the overall communication session. To illustrate, the phone in this example can display an image of a broken link next to any device with a quality and/or performance level below a specific threshold. The phone can also use colors, numbers, symbols, etc., to indicate a status associated with a device and/or communication session.

In another embodiment, the end-to-end RTCP analysis is used to display a visual representation of the communication session on a touch screen. Here, a user can interact with the communication session through the display. For example, the user can select a node to view additional details about the node. The display can include controls to allow the user to actively control the experience. For example, the user can control the type/amount of information that is collected/analyzed, the type/amount of information that is displayed, the method/format for displaying such information. Through the display, the user can also perform many other functions, such as transmitting an alert/indication for other devices in the communication session, displaying information at another location, forwarding information to another device, etc.

Figure 7:
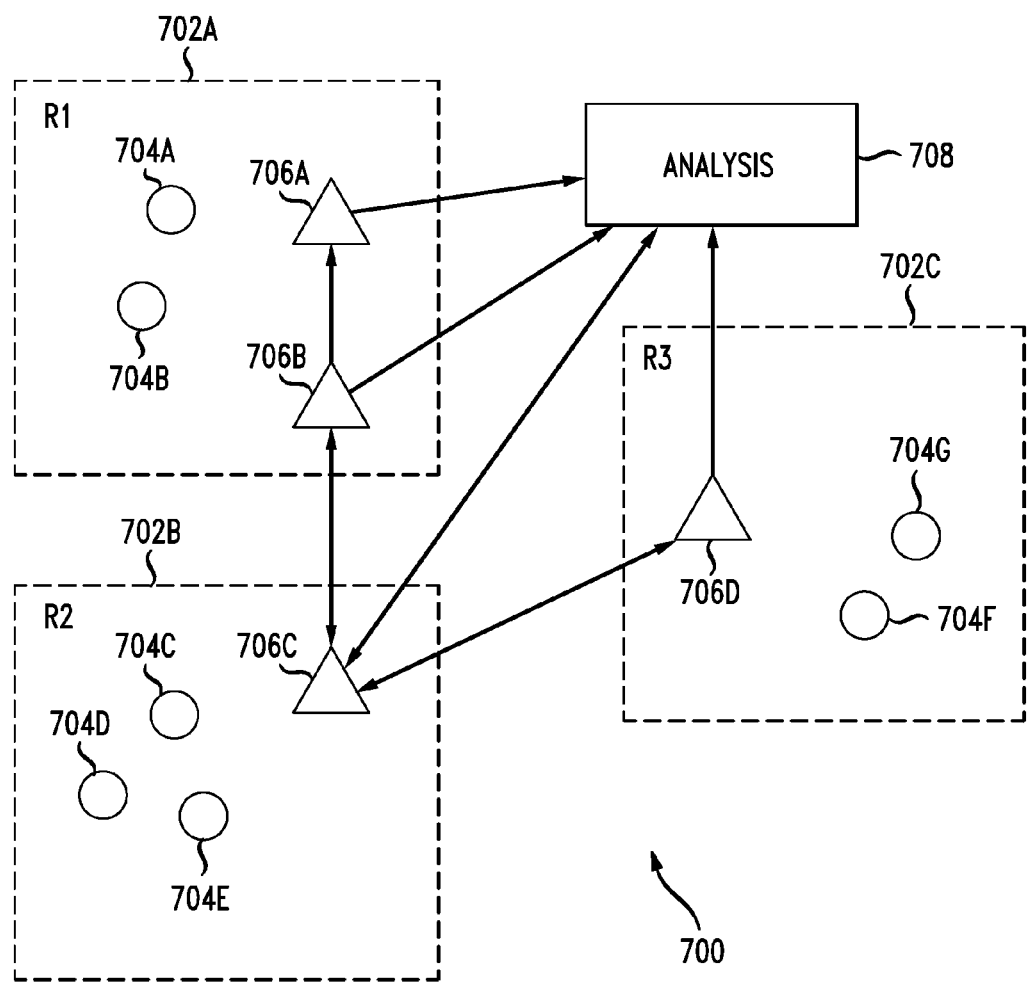
FIG. 7 illustrates an exemplary dynamic dual unicast real-time transport control protocol monitoring architecture.

FIG. 7 illustrates an exemplary dynamic dual unicast real-time transport control protocol monitoring architecture 700. The dynamic dual unicast RTCP monitoring process is similar to the dual unicast RTCP monitoring architecture 600; however, in the dynamic dual unicast RTCP monitoring architecture 700, the process is triggered by an event and the mechanism is distributed through the media topology that is relevant to the particular communication session. To this end, the dynamic dual unicast RTCP monitoring architecture 700 can use RTCP extensions to trigger the process and distribute the mechanism. The dynamic dual unicast RTCP monitoring architecture 700 can use the RTCP channel to distribute the RTCP extensions and any other RTCP data. This way, the RTCP extensions can be transmitted end-to-end, circumventing any problems that may arise when a node is behind a NAT, a firewall, or any other security device. Here, every node in the communication session may be reachable from every other node involved in the media path.

The RTCP extensions can include instructions to forward RTCP data in response to a triggering event, such as when a threshold is reached or a topology change is detected, for example. The RTCP extensions can also include parameters, such as a number of dual unicast RTCP packets that need to be forwarded, the destination address for the dual unicast RTCP packets, etc. The RTCP extensions can also include many additional types of information. For example, the RTCP extensions can include information about security, hardware, network status, transcoding, and any other aspect that is relevant for an end-to-end analysis of the media performance. The process can be triggered from any point in the media topology, at any time during the communication session. The triggering event can originate from any user or device associated with the communication session. Moreover, the triggering event can be automated or manually generated.

In FIG. 7, the dynamic dual unicast RTCP monitoring architecture 700 includes nodes 704A-G and 706A-D, which reside in multiple network regions 702A-C, and a centralized location 708 for collecting RTCP data. As one of ordinary skill in the art will readily recognize, the nodes 704A-G and 706A-D in other embodiments can reside in more or less network regions than illustrated in FIG. 7.

Nodes 706A-D represent the nodes involved in a particular communication session in the dynamic dual unicast RTCP monitoring architecture 700, and nodes 704A-G represent other nodes, which are not involved in the communication session. Here, nodes 706A-D forward RTCP data to the centralized location 708 based on forwarding instructions. The forwarding instructions propagate through the media topology that is relevant to the communication session (e.g., nodes 706A-D) to direct the relevant nodes in the media topology (e.g., nodes 706A-D).

The forwarding instructions can include instructions for forwarding RTCP data to one or more destination addresses in response to one or more triggering events. A destination address can include a port number, an IP address, a Media Access Control (MAC) address, a hostname, a uniform resource locator, an identifier, and so forth. The destination address in FIG. 7 includes an IP address and a port number associated with the centralized location 708. In one embodiment, the destination address includes one or more nodes 704A-G and 706A-D. In another embodiment, the destination address includes one or more RTCP data collectors residing in one or more networks.

The forwarding instructions can also define the amount and type of RTCP data that needs to be forwarded, as well as any other parameters associated with the forwarding mechanism. The forwarding instructions can be included in an RTP packet and/or transmitted via the RTCP channel as an RTCP extension, for example. An RTCP extension can include additional information associated with the communication session and/or nodes 706A-D, such as parameters, statistics, data, messages, descriptors, errors, options, reports, logs, and so forth.

Further, any device involved in the communication session can operate as an RTCP collector for the communication session. For example, node 706A can operate as an RTCP collector for the communication session. Here, the nodes 706B-D can forward RTCP data to node 706A as specified in the forwarding instructions. Any other node with sufficient resources can similarly operate as an RTCP collector. In FIG. 7, the centralized location 708 operates as an RTCP collector. Accordingly, the centralized location 708 collects the RTCP data forwarded from the nodes 706A-D. The centralized location 708 can also be configured to analyze the RTCP data to generate an end-to-end analysis of the communication session.

The centralized location 708 can analyze the RTCP data in response to a triggering event, such as, for example, a user request, or it can do so periodically according to, for example, a schedule, a parameter, etc. The end-to-end RTCP analysis can be used to monitor a communication session, troubleshoot a network problem, calculate an end-to-end quality of service, determine end-to-end security information, collect statistics, manage a communication session, calculate a media path, identify a problem, calculate an encryption status/level, obtain end-to-end feedback, determine and/or adjust configuration settings, determine a network topology, and so forth. The end-to-end RTCP analysis can also be used to generate an end-to-end summary, a session chart, an end-to-end report, and/or any representation of a communication session.

In one embodiment, the end-to-end RTCP analysis is used to generate an indication when a change in the network is detected. For example, the end-to-end RTCP analysis can be used to generate an audible alert when a node joins the communication session. As another example, the end-to-end RTCP analysis can be used by a node, such as a phone, to display a representation of the devices participating in the communication session, with a visual indication of the status of each device and/or the overall communication session. To illustrate, the phone in this example can display an image of a broken link next to a device when a quality and/or performance level associated with the device drops below a specific threshold. The phone can also use colors, numbers, symbols, etc., to indicate a status associated with a device and/or communication session.

In another embodiment, the end-to-end RTCP analysis is used to display a visual representation of the communication session on a touch screen. Here, a user can interact with the communication session through the display. For example, the user can select a node to view additional details about the node. The display can include controls to allow the user to actively control the experience. For example, the user can control the type/amount of information that is collected/analyzed, the type/amount of information that is displayed, the method/format for displaying such information, etc. Through the display, the user can also perform many other functions, such as transmitting an alert/indication for other devices in the communication session, displaying information at another location, forwarding information to another device, etc.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
receiving, by a first endpoint participating in a communication session conducted over an outward media path from the first endpoint to a second endpoint through a conferencing server, one or more real-time transport control protocol messages, the outward media path comprising a first media leg and a second media leg;
based on the received one or more real-time transport control protocol messages, determining, by the first endpoint, a first quality score for the first media leg and a second quality score for the second media leg; and
generating, by the first endpoint, an outward communication quality report based on the first quality score and the second quality score, wherein the outward communication quality report also identifies a security level for each of the first and second media legs.

2. The method of claim 1, wherein the communication session is further conducted over an inward path from the second endpoint to the first endpoint through the conferencing server, the inward media path comprising a third media leg and a fourth media leg.

3. The method of claim 2, further comprising:
based on the received one or more real-time transport control protocol messages, determining, by the first endpoint, a third quality score for the third media leg and a fourth quality score for the fourth media leg; and
generating an inward communication quality report based on the third quality score and the fourth quality score.

4. The method of claim 1, further comprising:
generating an overall communication quality report based on the outward communication quality report and an inward communication quality report.

5. The method of claim 1, further comprising:
determining, based on the outward communication quality report, how well a first participant associated with the first endpoint can be heard by a second participant associated with the second endpoint.

6. The method of claim 1, wherein the received one or more real-time transport control protocol messages are received from nodes along the outward media path.

7. The method of claim 1, further comprising:
receiving, by the first endpoint, additional real-time transport control protocol messages related to a third endpoint participating in the communication session, wherein the communication session is conducted further over a second outward media path from the first endpoint to the third endpoint through the conferencing server, the second outward media path comprising a third media leg and a fourth media leg;
based on the additional real-time transport control protocol messages, determining, by the first endpoint, a third quality score for the third media leg and a fourth quality score for the fourth media leg; and
generating a second outward communication quality report related to the first endpoint and the third endpoint based on the third quality score and the fourth quality score.

8. The method of claim 1, wherein the received one or more real-time transport control protocol messages are based a real-time transport control protocol message sent by the first endpoint that comprises a rule for when to send the received one or more real-time transport control protocol messages to the first endpoint and wherein the rule is based on a receipt of an Internet Control Message Protocol (ICMP) message.

9. The method of claim 1, further comprising:
determining a media topology of the communication session;
identifying one or more network components in the communication session that does decrypt media for the communication session; and
not defining the identified one or more networks components in the first and second media legs.

10. The method of claim 1, wherein the received one or more real-time transport control protocol messages are based a real-time transport control protocol message sent by the first endpoint that comprises a rule for when to send the received one or more real-time transport control protocol messages to the first endpoint and wherein the sent real-time transport control protocol message further comprises a first address of the first communication endpoint and a second address of a first device, wherein the second address allows a second device that receives the sent real-time transport control message to know where to send the received one or more real-time transport control messages based on exceeding a threshold defined in the rule.

11. The method of claim 1, wherein generating the outward communication quality report is based on determining a weakest leg between the first media leg and the second media leg.

12. A system comprising:
a processor; and
a computer-readable storage medium storing instructions which, when executed by the processor, cause the processor to perform operations comprising:
receiving, by a first endpoint participating in a communication session conducted over an outward media path from the first endpoint to a second endpoint through a conferencing server, one or more real-time transport control protocol messages, the outward media path comprising a first media leg and a second media leg,
based on the received one or more real-time transport control protocol messages, determining, by the first endpoint, a first quality score for the first media leg and a second quality score for the second media leg; and
generating an outward communication quality report based on the first quality score and the second quality score, wherein the outward communication quality report also identifies a security level for each of the first and second media legs.

13. The system of claim 12, wherein the communication session is further conducted over an inward path from the second endpoint to the first endpoint through the conferencing server, the inward media path comprising a third media leg and a fourth media leg.

14. The system of claim 13, the computer-readable medium storing additional instructions which, when executed by the processor, cause the processor to perform further operations comprising:
based on the received one or more real-time transport control protocol messages, determining, by the first endpoint, a third quality score for the third media leg and a fourth quality score for the fourth media leg; and
generating an inward communication quality report based on the third quality score and the fourth quality score.

15. The system of claim 12, the computer-readable medium storing additional instructions which, when executed by the processor, cause the processor to perform further operations comprising:
generating an overall communication quality report based on the outward communication quality report and an inward communication quality report.

16. The system of claim 12, the computer-readable medium storing additional instructions which, when executed by the processor, cause the processor to perform further operations comprising:
determining, based on the outward communication quality report, how well a first participant associated with the first endpoint can be heard by a second participant associated with the second endpoint.

17. The system of claim 12, wherein the received one or more real-time transport control protocol messages are received from nodes along the outward media path.

18. The system of claim 12, the computer-readable medium storing additional instructions which, when executed by the processor, cause the processor to perform further operations comprising:
receiving, by the first endpoint, additional real-time transport control protocol messages related to a third endpoint participating in the communication session, wherein the communication session is conducted further over a second outward media path from the first endpoint to the third endpoint through the conferencing server, the second outward media path comprising a third media leg and a fourth media leg;
based on the additional real-time transport control protocol messages, determining, by the first endpoint, a third quality score for the third media leg and a fourth quality score for the fourth media leg; and
generating a second outward communication quality report related to the first endpoint and the third endpoint based on the third quality score and the fourth quality score.

19. The system of claim 12, wherein the received one or more real-time transport control protocol messages are based a real-time transport control protocol message sent by the first endpoint that comprises a rule for when to send the received one or more real-time transport control protocol messages to the first endpoint and wherein the rule is based on a receipt of an Internet Control Message Protocol (ICMP) message.

20. A system comprising:
a processor; and
a computer-readable storage medium storing instructions which, when executed by the processor, cause the processor to perform operations comprising:
receiving, by a first endpoint participating in a communication session conducted over an outward media path from the first endpoint to a second endpoint through a conferencing server, one or more real-time transport control protocol messages, the outward media path comprising a first media leg and a second media leg, wherein the received one or more real-time transport control protocol messages are based a real-time transport control protocol message sent by the first endpoint that comprises a rule for when to send the received one or more real-time transport control protocol messages to the first endpoint and wherein at least one of:
the rule is based on a receipt of an Internet Control Message Protocol (ICMP) message; and
the sent real-time transport control protocol message further comprises a first address of the first communication endpoint and a second address of a first device, wherein the second address allows a second device that receives the sent real-time transport control message to know where to send the received one or more real-time transport control messages based on exceeding a threshold defined in the rule;
based on the received one or more real-time transport control protocol messages, determining, by the first endpoint, a first quality score for the first media leg and a second quality score for the second media leg; and generating an outward communication quality report based on the first quality score and the second quality score.

\* \* \* \* \*